United States Patent
Atsumi et al.

(10) Patent No.: US 8,141,903 B2
(45) Date of Patent: Mar. 27, 2012

(54) REINFORCING STRUCTURE FOR STEERING SUPPORT MEMBER

(75) Inventors: Ryo Atsumi, Shizuoka-ken (JP); Shinei Mochizuki, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 36 days.

(21) Appl. No.: 12/578,023

(22) Filed: Oct. 13, 2009

(65) Prior Publication Data

US 2010/0090451 A1   Apr. 15, 2010

(30) Foreign Application Priority Data

Oct. 15, 2008   (JP) .................................. 2008-266800

(51) Int. Cl.
*B62D 1/16* (2006.01)

(52) U.S. Cl. ............ 280/779; 280/771; 180/78; 180/90; 296/70; 296/72

(58) Field of Classification Search .................. 280/779, 280/771; 180/78, 90; 296/70, 72
See application file for complete search history.

(56) References Cited

U.S. PATENT DOCUMENTS

| | | | |
|---|---|---|---|
| 5,282,637 A * | 2/1994 | McCreadie | 296/203.02 |
| 5,868,426 A * | 2/1999 | Edwards et al. | 280/779 |
| 6,276,740 B1 * | 8/2001 | Mellor et al. | 296/72 |
| 6,382,695 B1 * | 5/2002 | Decome | 296/70 |
| 6,394,527 B2 * | 5/2002 | Ohno et al. | 296/72 |
| 6,450,533 B1 * | 9/2002 | Kimura et al. | 280/779 |
| 6,523,878 B2 * | 2/2003 | Scheidel | 296/70 |
| 6,698,793 B2 * | 3/2004 | Takano et al. | 280/748 |
| 7,150,489 B2 * | 12/2006 | Yoshida et al. | 296/72 |
| 7,516,986 B2 * | 4/2009 | Kokubo | 280/779 |
| 7,731,261 B2 * | 6/2010 | Wenzel et al. | 296/70 |
| 2007/0222200 A1 * | 9/2007 | Kukubo | 280/779 |
| 2010/0140912 A1 * | 6/2010 | Zornack et al. | 280/779 |

FOREIGN PATENT DOCUMENTS

| | | | |
|---|---|---|---|
| DE | 10200890 A1 * | 7/2003 | |
| DE | 102006033606 A1 * | 1/2008 | |
| EP | 1234744 A2 * | 8/2002 | |
| JP | 09-277961 A | 10/1997 | |
| JP | 2006264444 A * | 10/2006 | |
| WO | WO 9407734 A1 * | 4/1994 | |

* cited by examiner

*Primary Examiner* — Faye M Fleming
*Assistant Examiner* — James English
(74) *Attorney, Agent, or Firm* — Lerner, David, Littenberg, Krumholz & Mentlik, LLP

(57) ABSTRACT

There is provided a reinforcing structure for a steering support member, which is made up of a pipe part, and is set across in the vehicle width direction. In this reinforcing structure, a pin part is penetratingly arranged along the vehicle longitudinal direction in a location in which a steering bracket of the steering support member is fixed, and the end portions of the pin part are fixed to the outer peripheral surface of the pipe part.

2 Claims, 3 Drawing Sheets

REINFORCING STRUCTURE FOR STEERING SUPPORT MEMBER

CROSS-REFERENCE TO RELATED APPLICATIONS

The present application claims priority from Japanese Patent Application No. 2008-266800, filed in the Japanese Patent Office on Oct. 15, 2008, the disclosure of which is hereby incorporated herein by reference.

BACKGROUND OF THE INVENTION

The present invention relates to a reinforcing structure for a steering support member that is set across in the vehicle width direction in an instrument panel of a motor vehicle to support a steering column.

Conventionally, in an instrument panel of a motor vehicle, a steering support member for supporting a steering column and the like has been set across in the vehicle width direction.

This steering support member is made up of a metallic pipe part, and the driver's seat side thereof is required to have a higher rigidity than the passenger's seat side because the driver's seat side supports the steering column and the like.

To meet this requirement, some conventional motor vehicles are equipped with a deck cross member (steering support member) in which the driver's seat side thereof has a higher rigidity than the passenger's seat side as disclosed in JP 9-277961 A. Specifically, in such a motor vehicle, a large-diameter pipe is used on the steering column side and a small-diameter pipe is used on the opposite side, the diameter of one end of the small-diameter pipe is increased, and the end portion of the large-diameter pipe is pressed into the diameter-increased part of the small-diameter pipe, thereby joining the large-diameter pipe and the small-diameter pipe together.

Unfortunately, the above-described conventional reinforcing structure for a deck cross member requires a plurality of pipes having different diameters, and also requires fabrication for increasing the pipe diameter to join these pipes together. Therefore, the conventional reinforcing structure has a problem of increased work manpower and equipment cost.

BRIEF SUMMARY OF THE INVENTION

The present invention has been made in view of the above circumstances, and accordingly, an object thereof is to provide a reinforcing structure for a steering support member, which can, as the steering support member that is set across in the vehicle width direction in an instrument panel to support the steering column, partially reinforce a location, such as a support part of a steering column, requiring a higher strength than other locations even in the case in which a pipe part having a fixed diameter throughout the entire length of the member is used.

To solve the problem in the conventional art, the present invention provides a reinforcing structure for a steering support member, which is made up of a pipe part, and is set across in the vehicle width direction, wherein a pin part is penetratingly arranged along the vehicle longitudinal direction in a location in which a steering bracket of the steering support member is fixed, and the end portions of the pin part are fixed to the outer peripheral surface of the pipe part.

Also, in the present invention, the pin part is arranged in both end portions of a fixing part extending along the vehicle width direction, in which the steering bracket is fixed to the pipe part, and the pin part is formed as a pair.

Furthermore, the axial direction of the paired pin parts is arranged so as to make a tilt angle equivalent to that of the fixing surface for fixing a steering shaft to the steering bracket.

Still further, at a middle position of the paired pin parts, a middle pin part tilted to an angle symmetrical with respect to the horizontal direction of the vehicle longitudinal direction is arranged, and the paired pin parts and the middle pin part are arranged so as to intersect with each other as viewed from the vehicle side surface.

As described above, the reinforcing structure for a steering support member in accordance with the present invention is made up of the pipe part, and is set across in the vehicle width direction, and also the pin part is penetratingly arranged along the vehicle longitudinal direction in a location in which the steering bracket of the steering support member is fixed, and the end portions of the pin part are fixed to the outer peripheral surface of the pipe part. Therefore, even in the case in which the pipe part having a fixed diameter throughout the entire length of the steering support member is used, the rigidity of a location, such as a support part of a steering column, requiring a higher strength than other locations, can be improved, vibrations of the steering system can be suppressed efficiently, and the operation quality and the comfort in the vehicle compartment can be upgraded.

Also, since the reinforcing structure in accordance with the present invention is provided by using the pipe part and pin parts, which are standard products, the part cost can be reduced. Moreover, by using the pin parts, a great reinforcing effect can be achieved by a minimum installation space, and also an influence is scarcely exerted on the layout of peripheral parts, so that this reinforcing structure can be applied to various types of motor vehicles.

Also, according to the reinforcing structure in accordance with the present invention, the pin part is arranged in both end portions of the fixing part extending along the vehicle width direction, in which the steering bracket is fixed to the pipe part, and the pin part is formed as a pair. Therefore, the fixing part of the steering bracket can be reinforced effectively, and even if torsion or the like occurs in the welding location, which is the fixing part of the steering bracket, the steering bracket can be prevented from being peeled off the steering support member.

Furthermore, according to the reinforcing structure in accordance with the present invention, since the axial direction of the paired pin parts is arranged so as to make a tilt angle equivalent to that of the fixing surface for fixing the steering shaft to the steering bracket, effective reinforcement can be provided against loads imposed by the steering shaft via the steering bracket.

Still further, according to the reinforcing structure in accordance with the present invention, at a middle position of the paired pin parts, the middle pin part tilted to an angle symmetrical with respect to the horizontal direction of the vehicle longitudinal direction is arranged, and the paired pin parts and the middle pin part are arranged so as to intersect with each other as viewed from the vehicle side surface. Therefore, the steering support member can also withstand a load having a degree of width in the vehicle longitudinal direction, and the steering support member can achieve a high reinforcing effect against the input load from the steering bracket.

DETAILED DESCRIPTION

Figure 1:
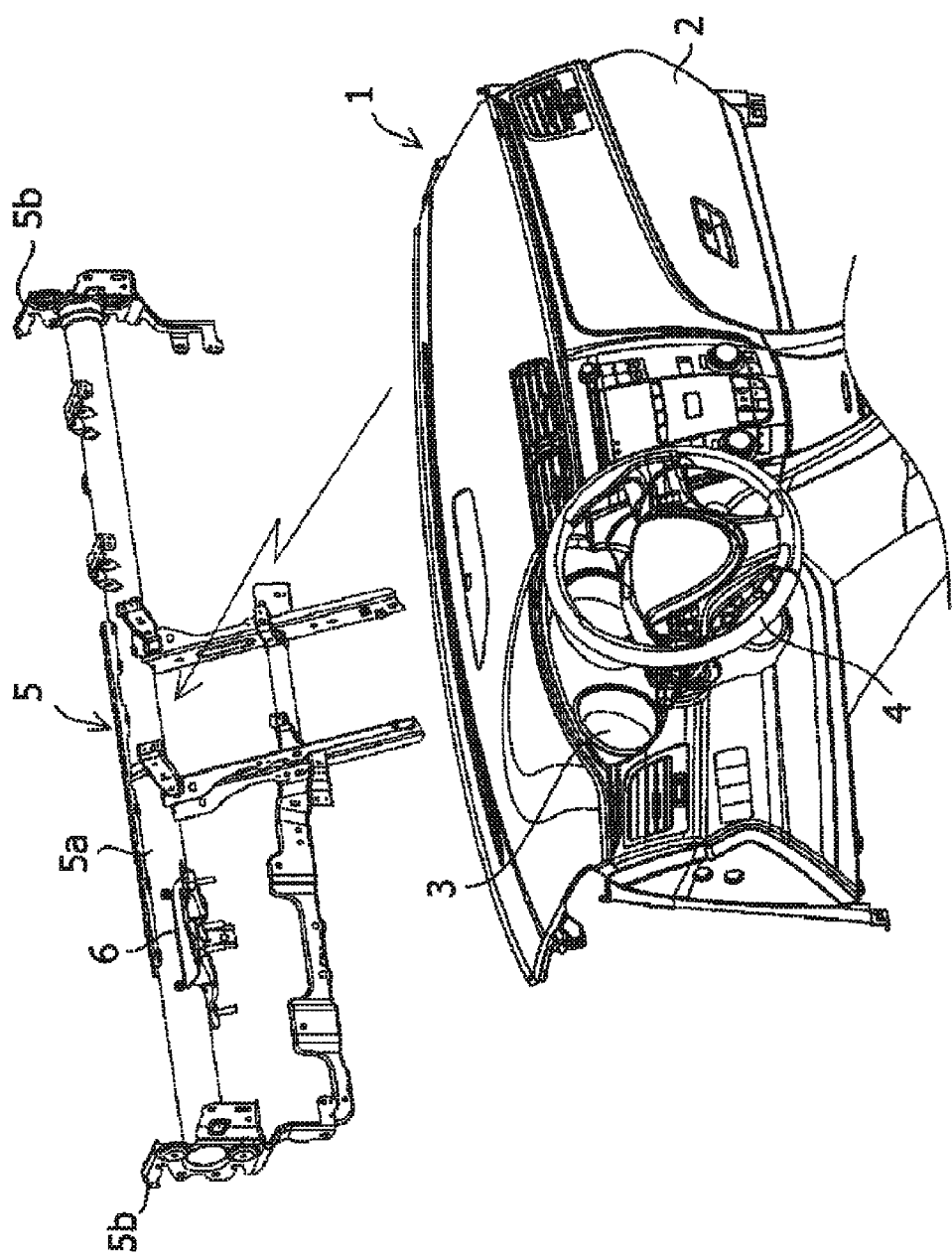
FIG. 1 is an exploded perspective view of an automotive instrument panel to which a reinforcing structure for a steering support member in accordance with an embodiment of the present invention is applied.

The present invention will now be described in detail based on an embodiment shown in the drawings.

Figure 2:
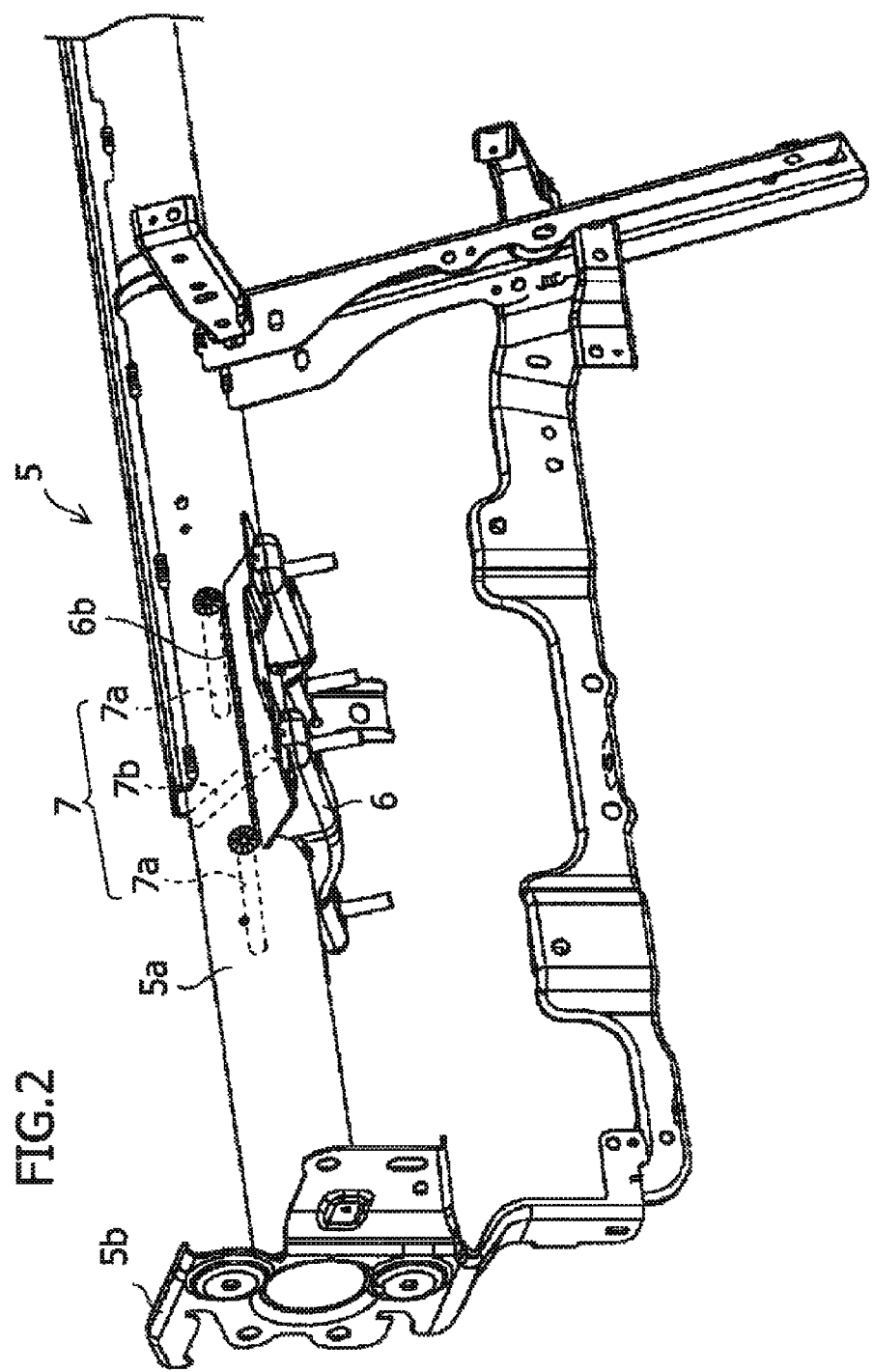
FIG. 2 is a perspective view of the steering support member and the peripheral parts thereof shown in FIG. 1.
Figure 3:
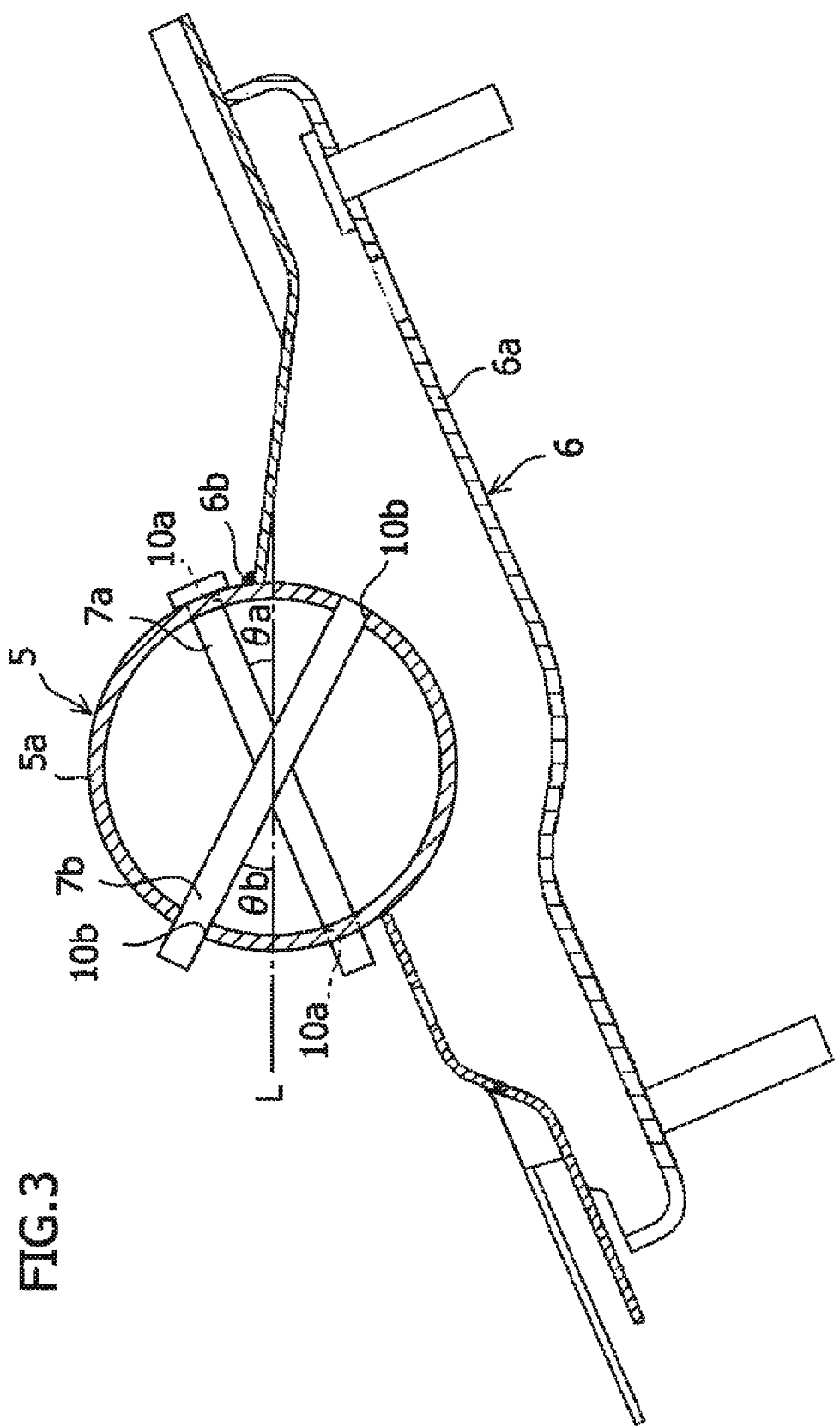
FIG. 3 is a sectional view of the steering support member and the peripheral parts thereof shown in FIG. 1.

FIG. 1 is an exploded perspective view of an automotive instrument panel to which a reinforcing structure for a steering support member in accordance with an embodiment of the present invention is applied, FIG. 2 is a perspective view of the steering support member and the peripheral parts thereof shown in FIG. 1, and FIG. 3 is a sectional view of the steering support member and the peripheral parts thereof shown in FIG. 1.

As shown in FIG. 1, on the front side in the vehicle compartment of a motor vehicle, an instrument panel body 1, which is a large resin molded part, is disposed, and this instrument panel body 1 is provided with various kinds of equipment. Among these pieces of equipment, a glove box 2 serving as a storage part is provided on the passenger's seat side of the instrument panel body 1, and on the other hand, a meter 3 is arranged on the driver's seat side thereof. Also, through an opening provided under the meter 3, a steering column shaft, not shown, is insertedly arranged, and at the tip end on the vehicle compartment side of the shaft, a steering wheel 4 is installed.

The instrument panel body 1 is supported by a steering support member 5 extending in the vehicle width direction. This steering support member 5 is arranged inside the instrument panel body 1, being set across throughout the entire width in the vehicle width direction, and is fixed to vehicle side walls, not shown, by brackets 5b at both right and left ends.

The steering support member 5 is mainly composed of a pipe part 5a that extends in the vehicle width direction and has a fixed diameter throughout the entire length, and the brackets 5b provided at both right and left ends of the pipe part 5a, which are main constituent parts of steering support member comp. With respect to these comp structures, various types of support brackets are disposed so as to extend from the pipe part 5a, so that some pieces of equipment, such as an audio system, air-conditioning equipment, and a storage part, installed inside the instrument panel body 1 in such a manner as to face to the design surface of the instrument panel body 1 are supported on the steering support member 5.

Similarly, to the outer peripheral surface of the pipe part 5a located on the driver's seat side of the steering support member 5, as shown in FIGS. 1 and 2, a steering bracket 6 for supporting the steering column shaft serving as the rotating shaft of the steering wheel 4 is fixed by welding or like means. The location in which this steering bracket 6 is installed is a location requiring an especially high strength because the steering bracket 6 supports a steering part that is operated always and has a heavy weight, and ensures steady running of the motor vehicle and safe behavior of steering system against input load.

Therefore, the steering bracket 6 is formed into a box shape provided with a closed cross section so as to be advantageous in terms of strength, and is fixed to the pipe part 5a of the steering support member 5 by a welding part 6b for welding the proximal end side thereof with some degree of width being provided in the vehicle width direction.

Also, the strength of the steering bracket 6 must be improved, and at the same time, the strength of the pipe part 5a of the steering support member 5, which serves as a support part of the steering bracket 6, must also be improved. In order to maintain the strength of the pipe part 5a, it is necessary to prevent the cross-sectional area thereof from being reduced by radial collapse or the like.

Thereupon, in the reinforcing structure in accordance with the embodiment of the present invention, as shown in FIGS. 2 and 3, to prevent the cross-sectional area of the pipe part 5a from being reduced by deformation of the location in which the steering bracket 6 is fixed, a plurality of pin parts 7 (7a, 7b) are penetratingly arranged along the radial direction (the vehicle longitudinal direction) perpendicular to the axial direction of the pipe part 5a, and both ends thereof are fixed to the outer peripheral wall surface of the pipe part 5a by welding or like means. Thereby, the pin part 7 has a construction such as to play a role of a prop against loads imposed by the steering column shaft, not shown, and to be capable of preventing the radial deformation of the pipe part 5a.

Moreover, in the reinforcing structure in accordance with the embodiment of the present invention, to further enhance the reinforcing effect, some thought has been put into the arrangement relationship of the plurality of pin parts 7 (7a, 7b). Specifically, as shown in FIG. 2, in the vicinity of both end portions of the welding part (fixing part) 6b along the vehicle width direction, in which the steering bracket 6 is welded to the pipe part 5a, the pin parts 7a are arranged at a predetermined interval. These two pin parts 7a are formed as a pair, and as shown in FIG. 3, the axes of the paired pin parts 7a are arranged so as to make a tilt angle θa that is approximately equivalent to the tilt angle of a lower surface 6a of the steering bracket 6, which serves as a surface for fixing the steering shaft (not shown).

Thereby, a high reinforcing effect can be achieved against input loads in the axial direction of the steering shaft that is used frequently. Also, by welding the end portions of the pin parts 7a to both ends of the welding part 6b, in which the steering bracket 6 is welded to the pipe part 5a on the vehicle front side, the end portions of the welding part 6b of the steering bracket 6, in which stresses caused by vibrations and the like are liable to concentrate, are reinforced, and the welding part 6b is prevented from being peeled off the pipe part 5a.

Also, at an approximately middle position in the vehicle width direction of the paired pin parts 7a, as shown in FIGS. 2 and 3, a middle pin part 7b is arranged at an angle so as to intersect with the paired pin parts 7a as viewed from the vehicle side surface. By the presence of this middle pin part 7b, even when the angle of the steering shaft is changed by a high load, an effect as a prop can be achieved. The tilt angle θb of the middle pin part 7b with respect to the paired pin parts 7b is an angle symmetrical with the paired pin part 7a with respect to the horizontal direction L as shown in FIG. 3. By the above-described arrangement, a high reinforcing effect can be achieved in the vehicle longitudinal direction.

In the method for fixing the pin part 7 to the pipe part 5a, first, a pair of through holes 10 (10a, 10b), which face each other in the radial direction perpendicular to the center axis of the pipe part 5a, are formed in the peripheral wall surface of the pipe part 5a, and then, after the pin part 7 is inserted through these through holes 10, the end portion on the vehicle compartment side (vehicle rear side) is fixed by welding. Also, the dimension of the pin part 7 is determined so that the end portion on the engine room side (vehicle front side) projects from the pipe part 5a to absorb a dimensional error and to fix the jig.

Thus, in the reinforcing structure for a steering support member 5 in accordance with the embodiment of the present invention, the pin parts 7 are penetratingly arranged in the radial direction of the pipe part 5a in the range in which the steering bracket 6 for supporting the steering column, not shown, is fixed of the steering support member formed by the pipe part 5a having a fixed diameter, and also the end portions of the pin parts 7 are fixed to the outer peripheral surface of the pipe part 5a by welding or the like means. Therefore, the pin parts 7 play a role of a prop against loads imposed by the steering shaft, so that a high reinforcing effect can be achieved by a simple construction. Such a reinforcing structure can be provided merely by the following procedure: the through holes 10 are formed in the outer peripheral surface of the commercially available standard-product pipe part 5, and the commercially available standard-product pin parts 7 are inserted and thereafter fixed. Therefore, a partial reinforcing effect can be given to a location requiring rigidity on the driver's seat side by simple fabrication and a small number of parts. Moreover, the reinforcing structure using the pin parts 7 can keep the space to a minimum, so that an influence on the arrangement of other peripheral parts can be minimized as much as possible.

More specifically, the following effects can be achieved by the features of the reinforcing structure for the steering support member 5 in accordance with the embodiment of the present invention.

(1) By welding the penetratingly arranged pin parts to the pipe-shaped steering support member 5 that is manufactured by the pipe part 5a extending in the vehicle width direction, the rigidity of the steering support member 5 can be improved easily.

(2) Since the rigidity of a steering mounting part is secured by the effect of item (1), the vibrations of the steering system can be suppressed, and the operation quality can be upgraded.

(3) Since the plate thicknesses of other constituent parts can be decreased by the effects of items (1) and (2), the weight of the entirety of member comp can be reduced.

(4) Like item (3), a reinforcement having been used to improve the comp rigidity can be eliminated.

(5) By employing the pin parts 7, the performance can be enhanced at a low cost.

(6) From the above description, the cost of the entirety of member comp can be reduced.

(7) Since the above-described effects can be achieved without a change of part configuration and layout, the development to the existing machine types and the study therefor can be carried out easily.

(8) By changing the number and layout of the pin parts 7, countermeasures can be taken against various shapes and insufficient rigidity.

The above is a description of the embodiment of the present invention. The present invention is not limited to the above-described embodiment, and various modifications and changes can be made based on the technical concept of the present invention.

For example, in the above-described embodiment, the middle pin part 7b is provided at an approximately middle position in the vehicle width direction of the paired pin parts 7a. However, depending on the vehicle type to which the present invention is applied, the middle pin part 7b need not be provided, or a plurality of middle pin parts may be provided.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A reinforcing structure for a steering support member, comprising a pipe part, set across in a vehicle width direction, wherein a pin part having two ends is penetratingly arranged along a vehicle longitudinal direction in a location in which a steering bracket of the steering support member is fixed, and the two end portions of the pin part are welded to an outer peripheral surface of the pipe part, the pin part being arranged in both end portions of a fixing part extending along the vehicle width direction, in which the steering bracket is fixed to the pipe part, and pin part being formed as paired pin parts, wherein at a middle position of the paired pin parts, a middle pin part penetrates through the pipe part and tilts to an angle symmetrical with respect to a horizontal direction of the vehicle longitudinal direction, and the paired pin parts and the middle pin part are arranged so to intersect with each other as viewed from a vehicle side surface.

2. The reinforcing structure for a steering support member according to claim 1, wherein an axial direction of the paired pin parts is arranged so as to make a tilt angle equivalent to that of a lower surface of the steering bracket.

* * * * *

UNITED STATES PATENT AND TRADEMARK OFFICE
CERTIFICATE OF CORRECTION

PATENT NO. : 8,141,903 B2
APPLICATION NO. : 12/578023
DATED : March 27, 2012
INVENTOR(S) : Ryo Atsumi et al.

It is certified that error appears in the above-identified patent and that said Letters Patent is hereby corrected as shown below:

In the Claims:

Column 6, line 34 "and pin part" should read --and the pin part--

Signed and Sealed this
Eleventh Day of June, 2013

Teresa Stanek Rea
*Acting Director of the United States Patent and Trademark Office*